United States Patent [19]
Inoue

[11] Patent Number: 5,950,749
[45] Date of Patent: Sep. 14, 1999

[54] AUTOMOTIVE VEHICLE RUNNING ON BRAKEABLE BALL-BEARING CASTERS

[75] Inventor: Akira Inoue, Neyagawa, Japan

[73] Assignee: EXEDY Corporation, Neyagawa, Japan

[21] Appl. No.: 09/010,561

[22] Filed: Jan. 22, 1998

[30] Foreign Application Priority Data

Jan. 23, 1997 [JP] Japan ................................. 9-010545

[51] Int. Cl.$^6$ .................................................. B62D 57/00
[52] U.S. Cl. .......................................... 180/7.1; 180/907
[58] Field of Search ........................... 180/7.1, 7.2, 20, 180/907, 242, 244, 210, 212; 280/28.5

[56] References Cited

U.S. PATENT DOCUMENTS 2,603,301  7/1952  Sipior et al. .............................. 180/7
4,631,971  12/1986  Thornson .................................. 180/7.1
4,715,460  12/1987  Smith ....................................... 180/7.1
5,249,636  10/1993  Kruse et al. ............................. 180/907
5,374,879  12/1994  Pin et al. ................................. 180/7.1

Primary Examiner—Robert J. Oberleitner
Assistant Examiner—L. Jasmin
Attorney, Agent, or Firm—Shinjyu An Intellectual Property Firm

[57] ABSTRACT

A vehicle employing a drive source for both running and direction changing, a wheelchair 30 for running primarily on a floor surface 9 has a main body 31, a drive motor 32, three rotary bases 37, 38 and 39, and ball-bearing casters 1. The drive motor 32 is installed in the main body 31. Each of the rotary bases 37, 38 or 39 is driven by the drive motor 32 via drive axles. The ball-bearing casters 1 each include braking means, and are installed on the rotary bases 37, 38 and 39, wherein they ride on the floor surface 9.

10 Claims, 7 Drawing Sheets

AUTOMOTIVE VEHICLE RUNNING ON BRAKEABLE BALL-BEARING CASTERS

BACKGROUND OF THE INVENTION

1. Technical Field

The present invention relates to automotive vehicles running on ball-bearing casters, and in particular to electrically driven wheelchair vehicles employing ball-bearing casters as wheels.

2. Description of Related Art

Electrically driven wheelchairs as vehicles for the welfare of the elderly or ambulatory-impaired are universally in use. Such wheelchairs are designed to be omnidirectionally mobile; an example of a wheelchair thus constituted is illustrated in FIGS. 7 and 8.

As shown therein, four wheel assemblies 92 are installed in the lower portion of a main body 91 of a wheelchair 90. Each wheel assembly 92 comprises a change-direction axle 92a pivotally fitted onto the underside of the wheelchair main body 91, a fixed base 92b fixed to the lower end of the change-direction axle 92a, a wheel support 92c extending down from the stationary base 92b, a wheel 92d supported on the wheel support 92c, and a drive motor 92e mounted on the fixed base 92b for driving the wheel 92d to rotate. To change the orientation of the wheel assemblies 92, the change-direction axles 92a are pivoted by means of a change-direction motor 93. Accordingly, the wheelchair 90 is mobile in any direction.

In general, then, wheelchairs such as the wheelchair 90 and like vehicles for the welfare of the elderly and disabled will employ a change-direction motor separately from the drive motor.

In this regard, there would be cost benefits to a wheelchair that can both be driven and change direction by a single motor.

Further, from a structural standpoint, with conventional vehicles such as the foregoing wheelchair 90, wherein the running direction is to be switched, it is necessary to stop the vehicle momentarily and change the orientation of the wheels. There is a time lag between the direction-changing operation and the moment the direction is actually changed. In other words, in such conventional vehicles the control responsiveness with regard to direction-switching is low.

SUMMARY OF THE INVENTION

An object of the present invention is to construct an ambulatory assist vehicle so as to enable the running drive source to have dual application as the direction-switching drive source. A further object is to improve the direction-switching control responsiveness of the drive in such a vehicle.

The vehicle of the invention is floor-and-ground running, and in one aspect comprises a vehicle main body in which an axle drive source is installed; at least three downward extending drive axles rotatably mounted into the bottom of the vehicle main body; at least three rotary bases, each being fixed to the bottom of a drive axle for rotation therewith; and at least one ball-bearing caster installed on each of the rotary bases, wherein the casters ride on the floor or ground. The ball-bearing casters are equipped with a braking means.

Each ball-bearing caster is omnidirectionally mobile when its braking means is disengaged. Consequently, wherein the drive source is running yet the braking means are not engaged, each of the rotary bases is being driven to rotate on the drive axles, and movement of the rotary bases relative to the floor/ground is canceled out by the mutual counter-rotation of the ball-bearing casters i.e., the casters move essentially with only angular, not linear, acceleration. Therefore, the vehicle does not move with respect to the floor/ground; i.e., the vehicle is in a stationary running state.

Locomotion of the vehicle in an objective direction is achieved herein by actuating the braking means to brake only those ball-bearing casters which are located in predetermined positions with respect to the rotation of the rotary bases. Thereupon, the ball-bearing casters for which the braking means have been actuated gain momentary traction since the braking force is transmitted normal to the floor/ground, establishing adhesive friction between the braked casters and the floor/ground accordingly. The tangential components of the angular acceleration of each of the rotary bases (abbreviated to tangential acceleration hereinafter) are thus momentarily unidirectional in the braked ball-bearing casters, acting opposite the adhesive friction. Although during the interval in which the braking means are actuated the instantaneous angular accelerations of the rotary bases act outside the objective direction, because the braking means are actuated only momentarily as the ball-bearing casters pass the predetermined positions, the locomotive force is principally unidirectional. Thus ball-bearing casters momentarily in predetermined positions are selectively braked such that there is a resultant force in a desired direction due to the tangential accelerations of the rotary bases, causing the vehicle to run. Accordingly, the vehicle is steerable in any direction and is reversible by braking a combination of casters in appropriate positions on each rotary base and among the rotary bases.

Hence according to one aspect of the invention, the vehicle drive source driving the rotary bases is at once a running and direction-changing drive source. Switching the ball-bearing caster braking positions enables both the vehicle moving direction as well as the vehicle orientation to be changed with satisfactory responsiveness.

In order to improve the running stability and maneuverability of the vehicle, it is preferable to increase the number of rotary bases, as well as the number of ball-bearing casters installed on each rotary base.

According to another aspect, the vehicle of the present invention further comprises an axle drive train connected to the drive axles, wherein the axle drive train is configured to transmit driving power from the axle drive source to drive the drive axles such that at least two drive axles rotate in one direction while at least one other drive axle rotates in an opposite direction.

If the braking means could be actuated instantaneously when the ball-bearing casters are in particular predetermined positions, such that the only locomotive forces were solely the resultant forces in the objective direction due to the tangential accelerations of the rotary bases at the instant the braking means are actuated, the vehicle would run with ideal stability. In reality, however, actuation of the braking means must continue over a brief interval, throughout which the angular accelerations of the rotary bases are not always collinear, which tends to degrade running stability.

In the present aspect of the invention, since the rotary bases are driven via the drive train such that at least two counter-rotate, the radial components of the angular accelerations of the counter-rotating rotary bases tend to cancel each other out. Accordingly, degradation in running stability is curbed.

In a further aspect, a floor-and-ground running automotive vehicle of the present invention comprises a vehicle main body in which an axle drive source is installed; at least one downward extending drive axle rotatably mounted into the bottom of the vehicle main body; at least one rotary base fixed to the bottom of the drive axle for rotation therewith; and at least three ball-bearing casters, each equipped with a braking means and installed on the rotary base, wherein the casters ride on the floor or ground.

Herein the braking means are actuated to brake only that ball-bearing caster(s) which is located in a predetermined position with respect to the rotation of the at least one rotary base. Thus the ball-bearing caster(s) momentarily in a predetermined position(s) is selectively braked such that there is a resultant force in a desired direction due to the tangential acceleration of the at least one rotary base, causing the vehicle to run.

The vehicle is steerable by switching the position(s) of the caster(s) on the at least one rotary base which is braked.

Wherein a vehicle according to the present invention is equipped with a plurality of rotary bases, by appropriately establishing ball-bearing caster brake-actuating positions of the rotary bases, momentary resultant tangential forces of the rotary bases combined can be harnessed to propel the vehicle as well as to change its running direction.

In the vehicle constructed as described above, the vehicle drive source driving the rotary bases is at once a running and direction-changing drive source, and switching the ball-bearing caster braking positions enables both the vehicle moving direction as well as the vehicle orientation to be changed with satisfactory responsiveness.

In yet a further aspect, the ball-bearing caster of the invention in the foregoing aspects is capable of planar relative movement with respect to the floor/ground, and comprises a ball-bearing caster main body, a large ball, a plurality of small balls, and a braking element. The large ball runs on the floor/ground. The smaller diameter of the small balls is defined relative to the large ball, and the small balls ride against the caster main body on the surface of the large ball, following the rotation of the latter. The braking element can check the rolling motion of the small balls.

In general, in a ball-bearing caster, the large ball is retained in the ball-bearing caster main body through the small balls, by motion of which the large ball rotates freely against the ball-bearing caster main body. I.e., the large ball cannot rotate without corresponding motion of the small balls. The ball-bearing caster of the invention in the foregoing aspects is equipped with a braking element which when actuated checks the rolling motion of the small balls. Therefore, the ball-bearing caster is brakeable by engaging the braking element to check the motion of small balls.

In a still further aspect of the present invention, actuation of the braking element to each ball-bearing caster is controllable to steer the vehicle or reverse its running direction.

Herein, for example, the actuating mechanism provided for operational control to actuate the braking element just at that time when the ball-bearings are in the predetermined positions can be manually operated, or operational control can be conducted using air pressure, etc. by an actuating mechanism in which a solenoid is employed, fitted to the ball-bearing braking elements. By thus controlling the brake actuation, the vehicle can be driven by simple operations.

For finer driving control of the vehicle, wherein complex control elements, such as the drive speed of the drive source and the timing of corresponding ball-bearing braking means operations or the grouping of the ball-bearing brake actuating positions, are combined, it is desirable that the actuating mechanisms be controlled via a sequencer or computer.

According to yet another aspect, the vehicle of the invention in the foregoing aspects is an electrically driven wheelchair.

The foregoing and other objects, features, aspects and advantages of the present invention will become more apparent from the following detailed description, when taken in conjunction with the accompanying drawings, where like reference numerals denote corresponding parts throughout the various figures and embodiments of the present invention.

DETAILED DESCRIPTION OF THE PREFERRED EMBODIMENTS

Figure 1:
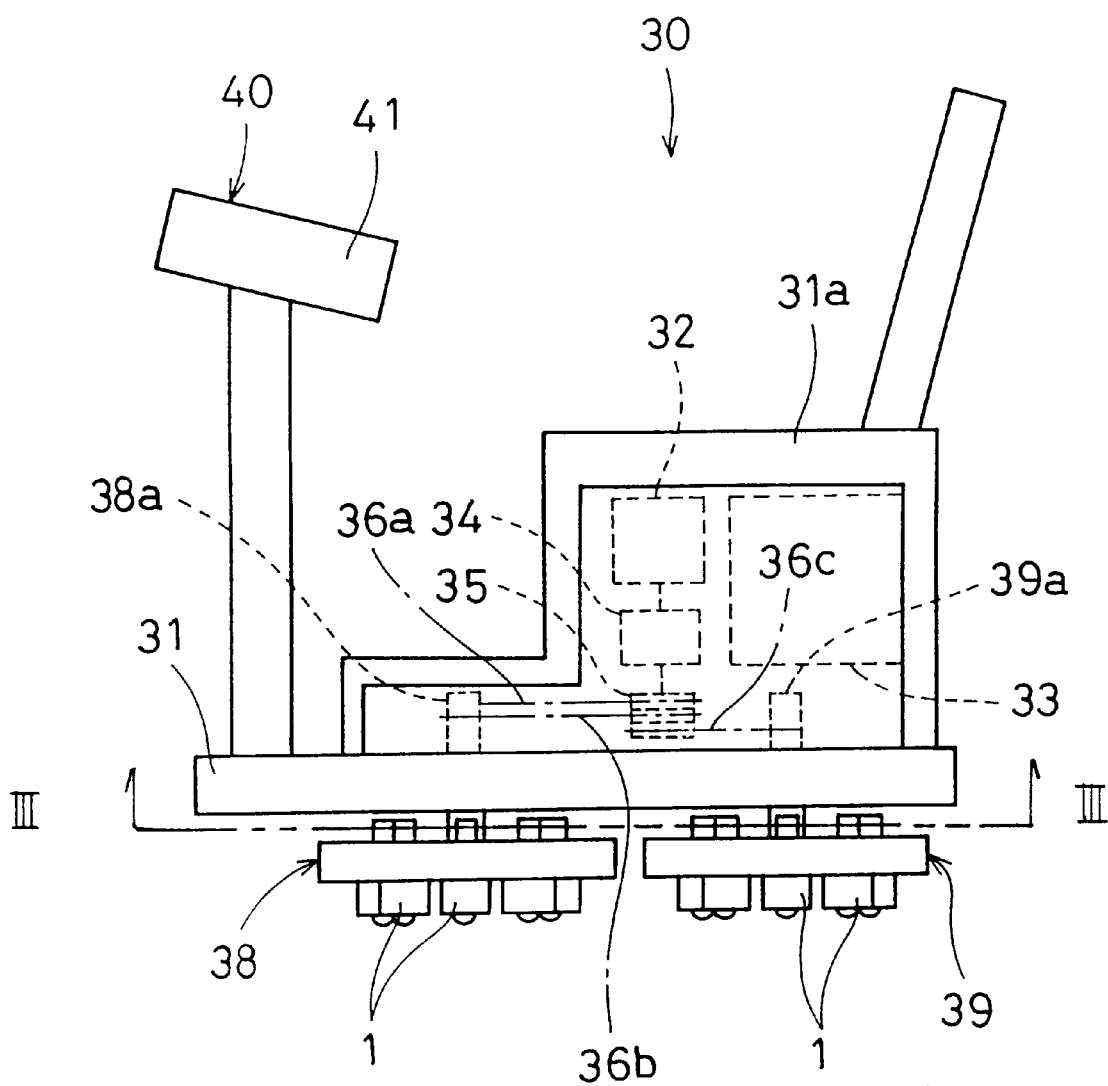
FIG. 1 is a schematic elevational view of a wheelchair in accordance with an embodiment of the present invention, wherein a drive source and associated components of the wheelchair are indicated by hidden lines.

Principal elements associated with the drive of an electrically powered wheelchair 30 in accordance with an embodiment of the present invention are illustrated in FIGS. 1 to 6. The wheelchair 30 is principally for indoor use as an ambulatory assist vehicle. The wheelchair 30 chiefly comprises a main body 31 carrying a chair 31a; a drive motor 32; three rotary bases 37, 38 and 39; ball-bearing casters 1, eight of which are installed on each of the rotary bases 37, 38, 39; and a control device 40 that includes an operation control panel 41.

Beneath the chair 31a in position on the upper surface of the main body 31, are the drive motor 32, supplied electric power by a battery 33, and a gear box 34, having an output axle to which a pulley 35 is fixed.

Torque from the drive motor 32 is input to the gear box 34, which steps down the rotational speed and transmits output torque to the gear box 34 output axle and the pulley 35. The torque on the pulley 35 is then transmitted via belts 36a, 36b and 36c to the rotary bases 37, 38 and 39, which will now be described.

Figure 2:
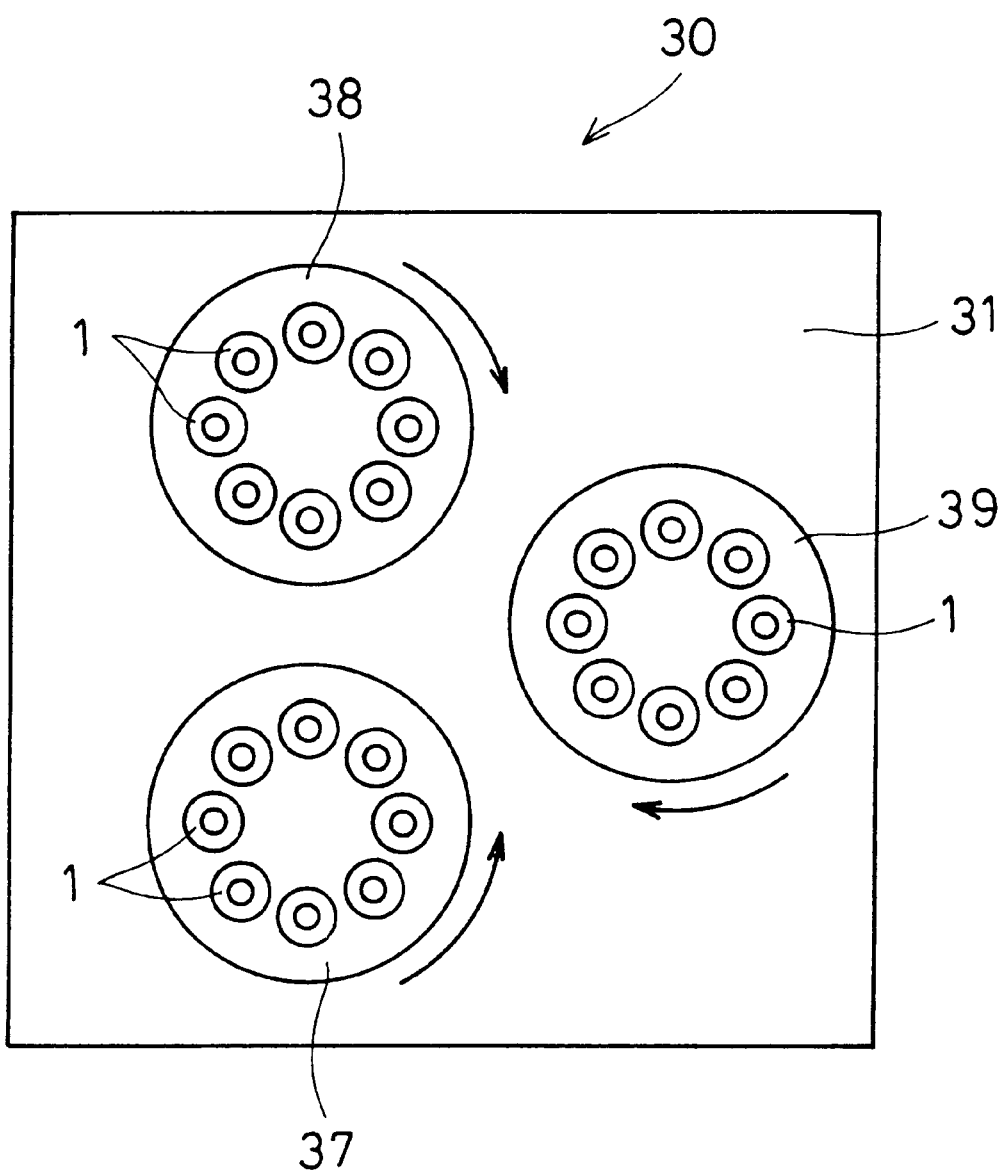
FIG. 2 is a plan view of the underside of the main body of the wheelchair in its stationary running state.

The rotary bases 37, 38 and 39 are disk-shaped, and on the upper sides have rotation axles 37a, 38a and 39a extending upward from the centers. The axially middle portions of the rotation axles 37a, 38a and 39a are supported via bearings in the main body 31 for free rotation. The upper portions of the axles of rotation 37a, 38a and 39a are belted by belts 36a, 36b and 36c, to rotate in accordance with the rotation of the pulley 35. The eight ball-bearing casters 1 are mounted onto the lower portion of each of the rotary bases 37, 38 and 39 at equally spaced circumferential intervals, as shown in FIG. 2.

Figure 4:
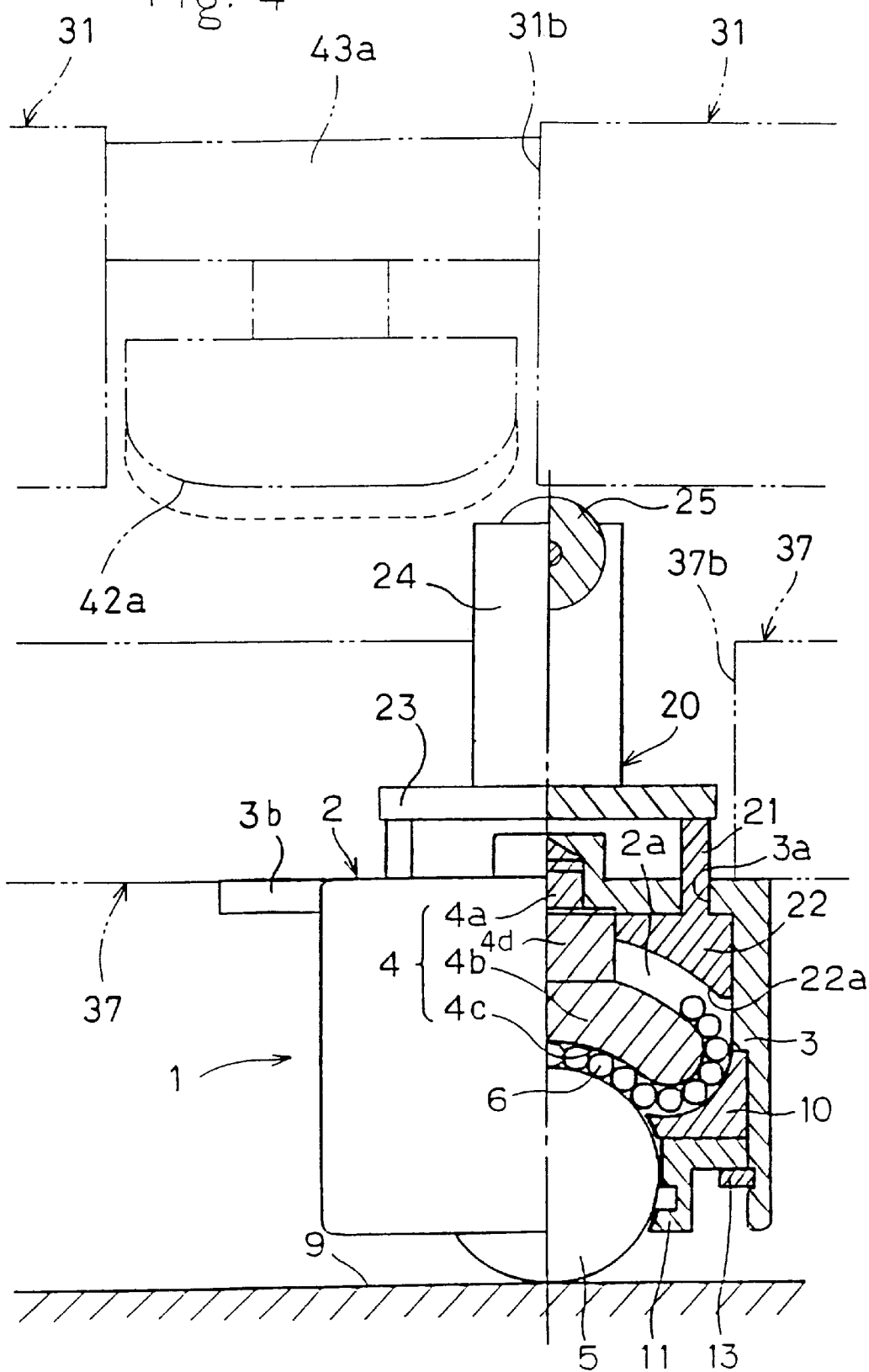
FIG. 4 is an enlarged-scale, partly in section view of a ball-bearing caster and braking mechanism wherein associated operational and mounting structures are shown in phantom.

The ball-bearing casters 1 make ground contact on the surface of a floor 9 as shown in FIG. 4 and are free to move in any direction on the floor surface 9. Each of the ball-bearing casters 1 has its own braking means, and switching between actuation and de-actuation of the braking means is accomplished by shifting a cluster stem 24 of a later described braking mechanism 20 upward or downward. The detailed structure of a ball-bearing caster 1 will also be described later.

The control device 40 chiefly comprises the operation control panel 41, as well as brake actuating cams 42a to 42l and reciprocating shifters 43a to 43l (only shifter 43a is depicted, in connection with cam 42a). The operation control panel 41 is fixed to the main body 31, situated in a location to enable operation by an operator sitting on the chair 31a. In the operation control panel 41, a drive motor 32 power switch, an adjusting lever to an inverter controller, as well as an operation panel for a sequencer that controls each of the reciprocating shifters 43a to 43l, are arranged.

Figure 3:
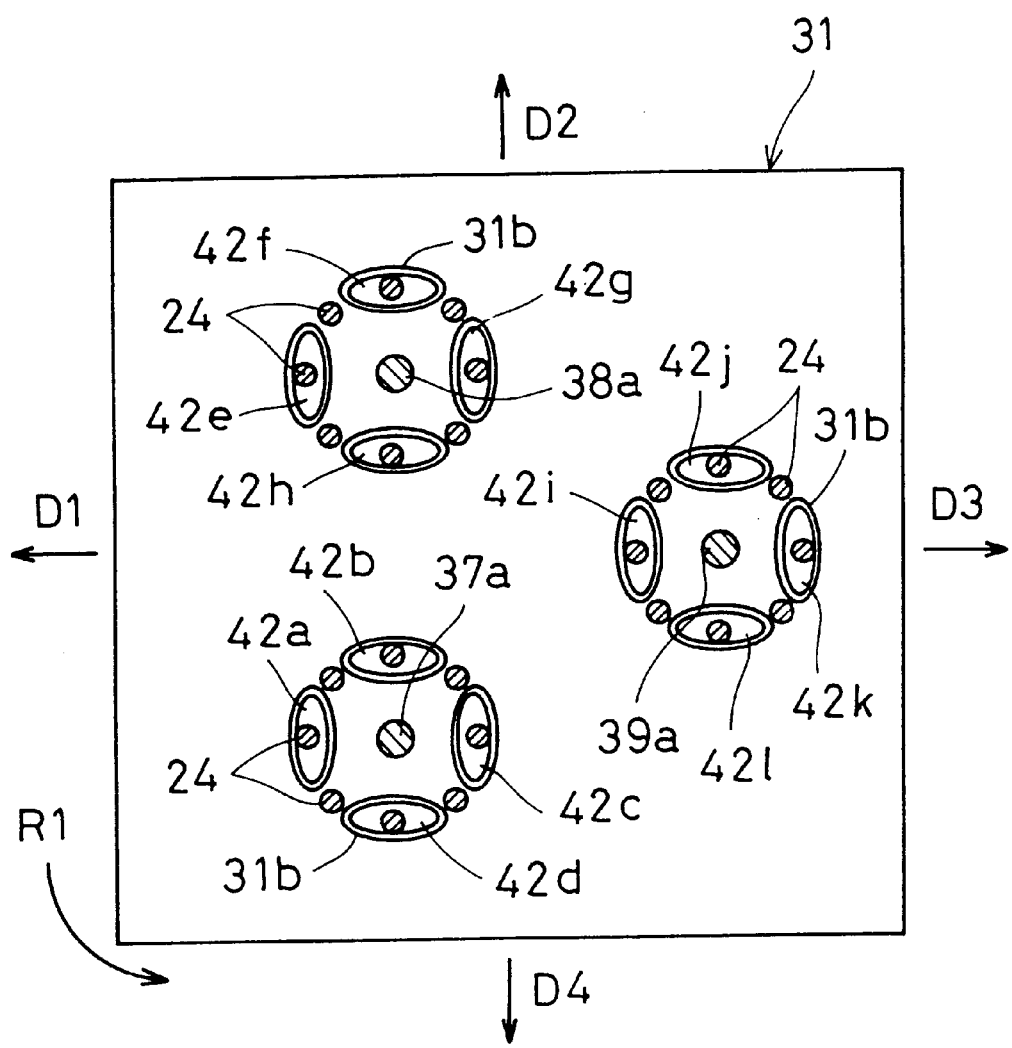
FIG. 3 is a horizontal sectional view of the wheelchair underside taken along the line III—III in FIG. 1 and seen in the direction of the arrows.
Figure 3A:
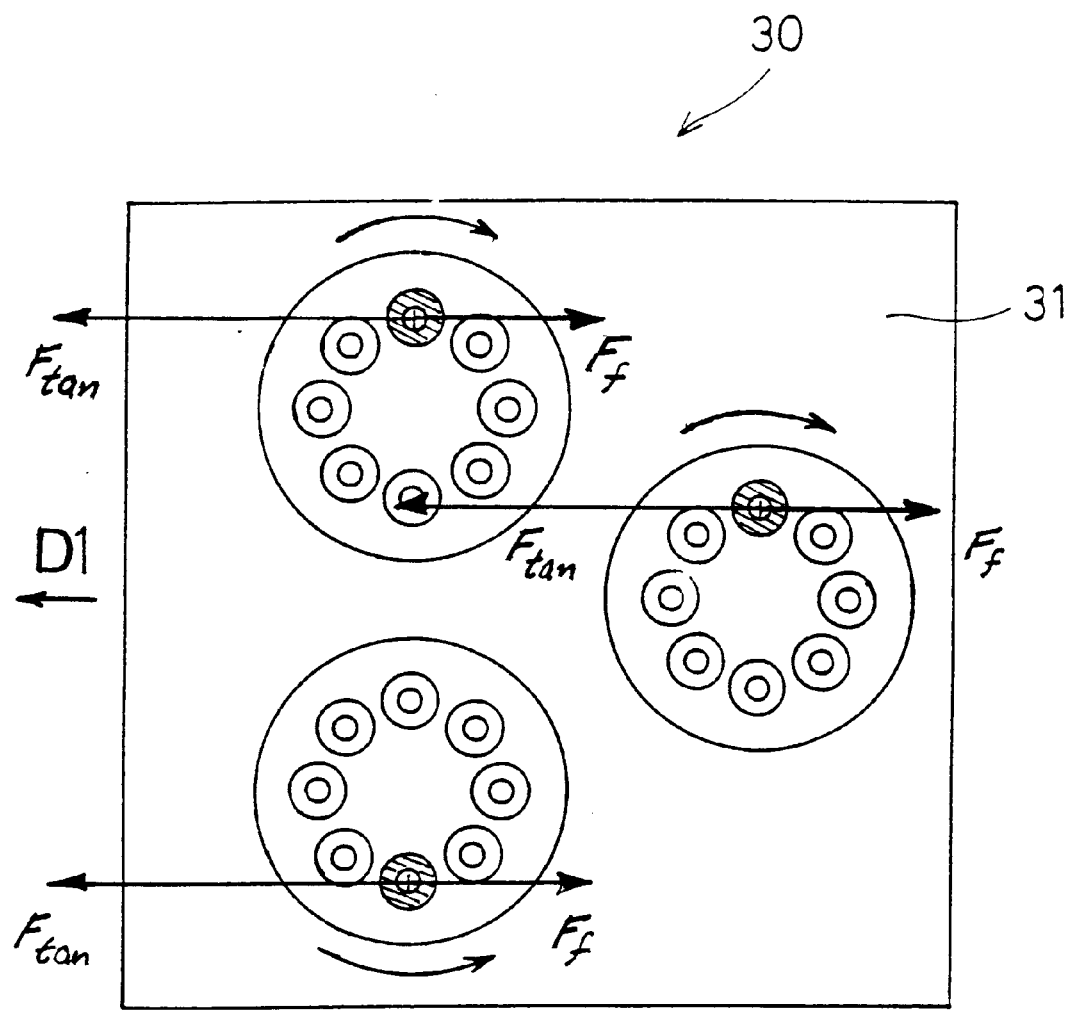

Referring to FIGS. 3 and 4, the reciprocating shifters 43a to 43l are installed in twelve respective holes 31b and fixed to the main body 31. The brake actuating cams 42a to 42l connected to the reciprocating shifters 43a to 43l accordingly are located in the holes 31b, wherein the under faces of the brake actuating cams 42a to 42l can be lowered by the reciprocating shifters 43a to 43l as far the height of the dotted line shown in FIG. 4.

The reciprocating shifters 43a to 43l shift the brake actuating cams 42a to 42l up and down in response to a command signal from the operation control panel 41. Herein, electrically driven ball cylinders are employed as the reciprocating shifters 43a to 43l, however, it is also possible to utilize apparatuses such as one employing air pressure from a small compressor, or else one employing electromagnets.

The detailed structure of the ball-bearing casters 1 will next be described.

Each ball-bearing caster 1, as shown in FIG. 4, chiefly comprises a ball-bearing caster main body 2, a large ball 5, a plurality of small balls 6, and a braking element 20. The ball-bearing caster main body 2 chiefly comprises a case 3, an inverted seat 4, a small-ball retaining cup 10 and a large ball retainer 11.

The case 3 is a box-shaped element the lower end of which is open and the upper end of which is perforated by a plurality of pin penetration holes 3a. A plurality of mounting ribs 3b are formed along the outer periphery of the upper end of the case 3. The mounting ribs 3b are fixed to the rotary bases 37, 38 and 39 by bolts.

The inverted seat 4 is located within and anchored into the case 3 by an anchoring stem 4a formed on the upper end of the inverted seat 4. The lower portion of the inverted seat 4 is formed as a bearing cup 4b with a curved rolling surface 4c. The distance between the outer peripheral margin of the bearing cup 4b and the opposing inner circumferential surface of the case 3 is dimensioned to allow passage of below-described small balls 6, which distance is therefore roughly equal to the diameter of the small balls 6. The rolling surface 4c is a locus of points equidistant from the surface of a below-described large ball 5 by the diameter of the small balls 6.

Installed in the lower, open end of the case 3, the large ball 5 rides on the floor surface 9. The large ball 5 is upwardly retained by the inverted seat 4 through the small balls 6.

The small balls 6 are of small diameter defined relative to the large ball 5, and are disposed between the large ball 5 and the inverted seat 4, between the small-ball retaining cup 10 and the rim of the inverted seat 4, and in a receiving space 2a defined by the outer, convex surface of the inverted seat 4, the opposing inner circumferential surface of the case 3, and a braking mechanism 20 to be described below. However, the small balls 6 are accommodated in the receiving space 2a such that a certain extent of space remains.

The braking mechanism 20 comprises a regulator 22, located in the case 3 on a shank 4d of the inverted seat 4, wherein it is capable of vertical relative displacement against the inner circumferential surface of the case 3 and the shank 4d. The braking mechanism 20 is further composed of a pin cluster 21 protruding from the regulator 22, a cluster retaining disk 23 to which the pins of the cluster 21 are fixed, and a cluster stem 24 carrying a follower wheel 25 and protruding upward from the center of the upper surface of the cluster retaining disk 23. In the top end of the cluster stem 24, the follower wheel 25 is mounted so as to rotate freely in line with the circumferential direction of the rotary bases 37, 38 and 39.

The pins of the cluster 21 protrude upward from the upper surface of the regulator 22, and pass through pin penetration holes 3a formed in the case 3. The pin cluster 21, the cluster retaining disk 23 and the cluster stem 24 are located in holes 37b, 38b and 39b provided in the rotary bases 37, 38 and 39, respectively.

Figure 5:
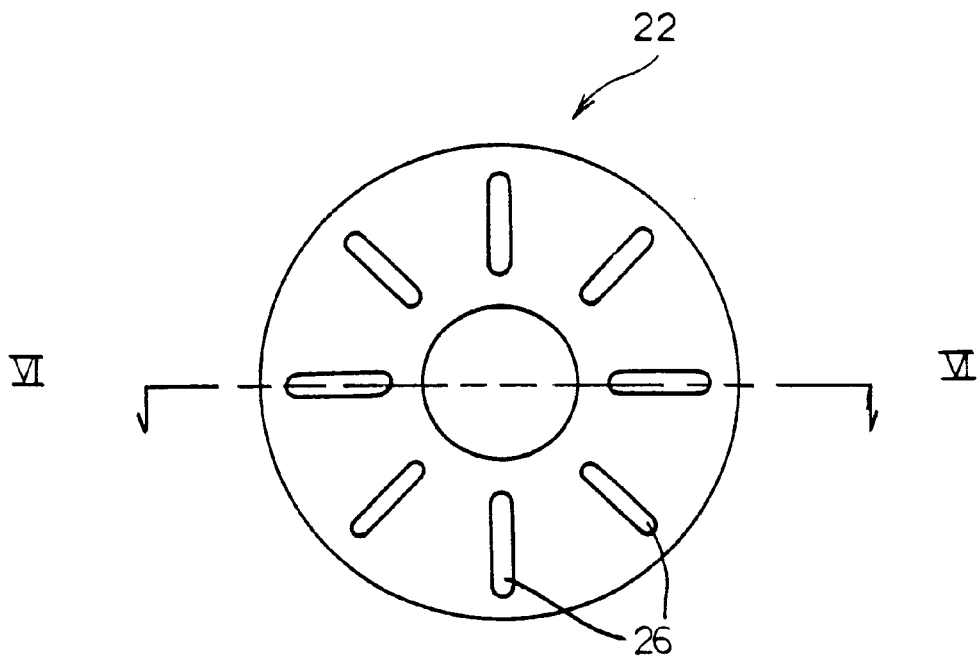
FIG. 5 is an underside plan view of a regulator of the braking mechanism shown removed therefrom.
Figure 6:
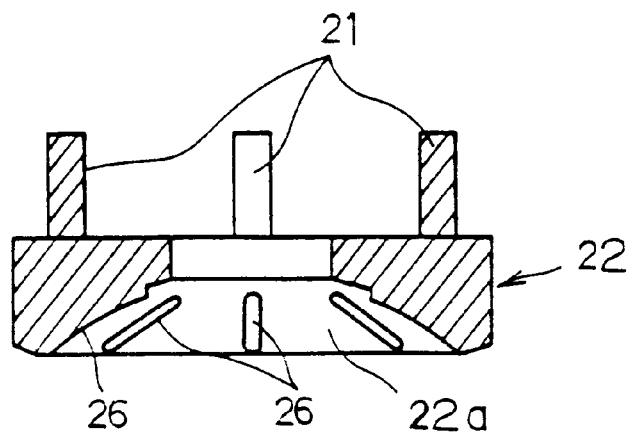
FIG. 6 is cross-sectional view of the braking mechanism regulator taken along the line VI—VI in FIG. 5 and seen in the direction of the arrows.
Figure 7:
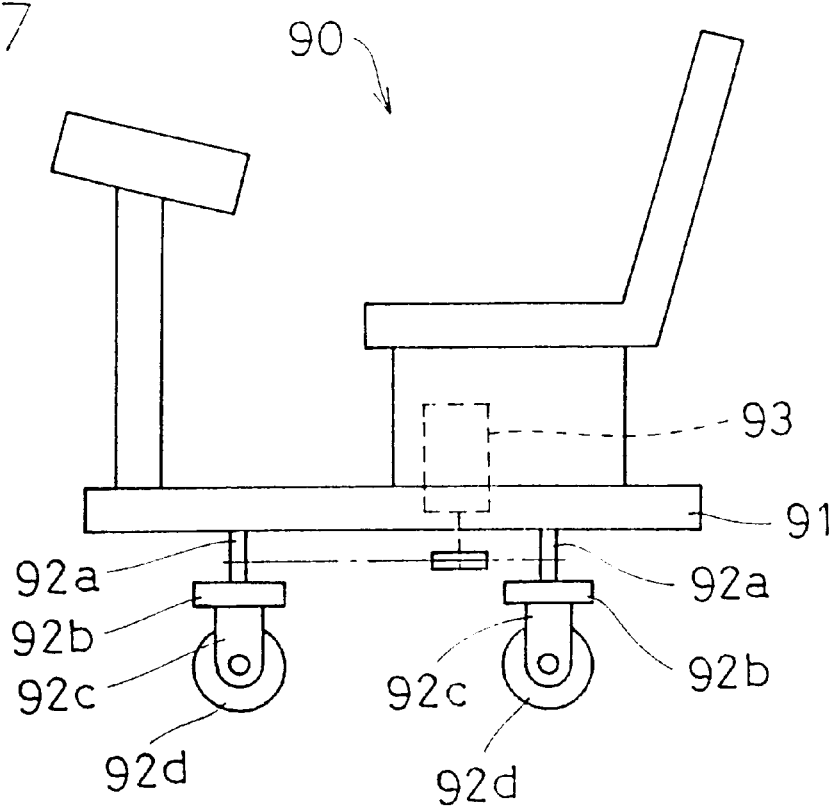
FIG. 7 is a schematic elevational view of a conventional wheelchair wherein a drive source thereof is indicated by hidden lines.
Figure 8:
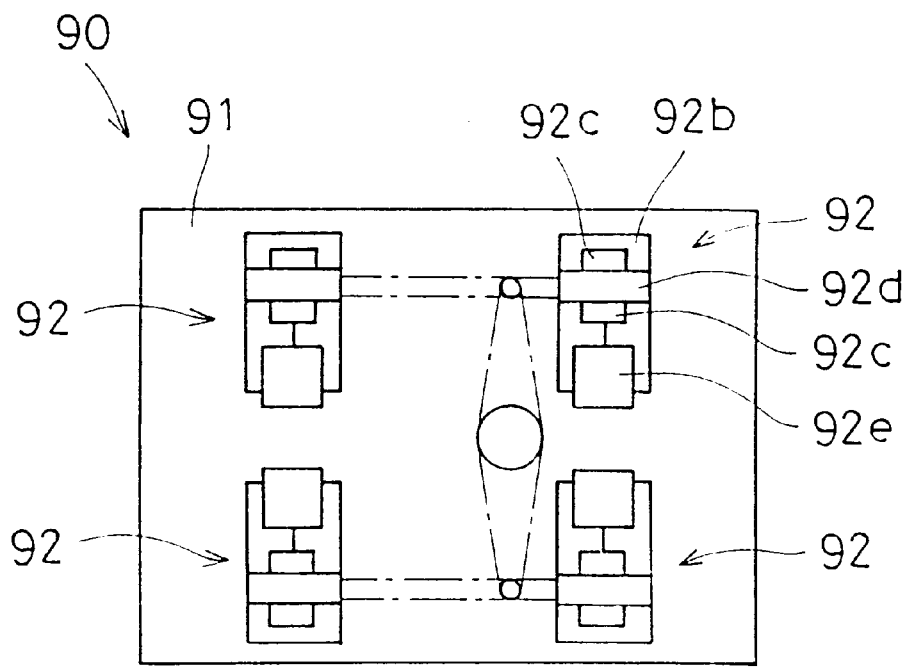
FIG. 8 is a plan view of the underside of the conventional wheelchair depicted in FIG. 5.

As further illustrated in FIGS. 5 and 6, the regulator 22 is saucer-shaped, and the surface opposed to and following the contour of the outer peripheral margin of the bearing cup 4b is a brake facing 22a which is stopped against adjacent small balls 6 when the braking mechanism 20 is actuated. The brake facing 22a optionally may be formed with brake ribs 26.

Next the action of the ball-bearing caster 1 will be explained with reference to the components as numbered in the FIG. 4 depiction.

Wherein the reciprocating shifter 43a is at the top of its movement, the brake actuating cam 42a is positioned as shown by the phantom lines in FIG. 4, while the top of the cluster stem 24 is even with the brake actuating cam 42a position indicated by the dotted line in the figure, into which position the brake actuating cam 42a is brought when the reciprocating shifter 43a is at the bottom of its movement. In other words, the braking mechanism 20 is in its unactuated position, wherein the small balls 6 can move freely in the receiving space 2a.

Herein, as the rotary bases 37, 38 and 39 are driven the ball-bearing caster 1 is freely mobile on the floor surface 9 by the rotation of the large ball 5 retained in the ball-bearing caster main body 2. When the large ball 5 rotates, all the small balls 6 riding on the surface of the large ball 5 roll along the rolling surface 4c of the inverted seat 4. Thus, in the direction in which the large ball 5 is rotating, the small balls 6 are impelled toward the space between the small ball retaining cup 10 and the inverted seat 4, and beyond into a portion of the receiving space 2a. Meanwhile, small balls 6 are replenished from the housing space 2a into the space between the large ball 5 and the inverted seat 4 rearward in the direction in which the ball-bearing caster 1 is moving as the large ball 5 rotates. Accordingly, the large ball 5 can go on omnidirectionally, continuously rotating against the ball-bearing caster main body 2, meaning that the ball-bearing caster 1 continues to move relative to the floor 9 as the rotary bases 37, 38 and 39 are driven.

Meanwhile, with the reciprocating shifter 43a at the bottom of its movement the brake actuating cam 42a is brought to the position indicated by the dotted line in FIG. 4. Therein, as the ball-bearing caster 1 turns by rotation of the rotary base 37 (in the FIG. 4 depiction), the follower wheel 25 on the cluster stem 24 comes into rolling contact with the brake actuating cam 42a and consequently the braking mechanism 20 is driven vertically downward. Therefore, the braking mechanism 20 moves downward against the inner circumferential surface of the case 3 and the shank 4d of the inverted seat 4, whereupon the brake facing 22a of the braking mechanism 20 is pressed against those small balls 6 currently lying on the outer, convex surface of the inverted seat 4 beneath the brake facing 22a. Consequently, travel of the small balls 6 within the receiving space 2a is stopped, and at the same time movement of the small balls 6 between the rim of the inverted seat 4 and the small-ball retaining cup 10, and moreover between the rolling surface 4c of the inverted seat 4 and the large ball 5 is restricted. Therefore, due to friction generated by the contact of large ball 5 with those immediate of the small balls 6, the large ball 5 is braked, stopping its rotation against the floor surface 9. At the same time, the frictional force between the large ball 5 and the floor surface 9 increases because the force normal to the floor surface 9 is increased by the force on the cluster stem 24 as the follower wheel 25 is driven downward riding on the brake actuating cam 42a. This force is transmitted to the floor surface 9 due to the rigidity imparted by the frictional resistance generated between the small balls 6 and the large ball 5.

Next, locomotion of the wheelchair 30 will be explained.

As indicated by the rotational arrows in FIG. 2, rotary base 37 is depicted as rotating counter-clockwise in the (vehicle underside) orientation of the figure, while rotary bases 38 and 39 are both depicted as rotating clockwise. Moreover, the rotating speeds of the rotary bases 37, 38 and 39 are equal.

Wherein the braking mechanisms 20 are in their unactuated position, i.e., the brake actuating cams 42a–42l are up as noted earlier, relative movement between the wheelchair 30 on the rotary bases 37, 38 and 39 and the floor surface 9 is continuously compensated by the omnidirectionally rotating ball-bearing casters 1, such that the wheelchair 30 does not move against the floor surface 9. In other words, the wheelchair 30 remains in a stationary running or idling state.

Wherein the wheelchair is to be steered in the D1 direction in FIG. 3 (leftward in the FIG. 3 orientation), the brake actuating cams 42d, 42f and 42j are driven downward by actuating the associated reciprocating shifters 43d, 43f and 43j through a command operation from the operation control panel 41. Thereupon, only those three ball-bearing casters 1 presently under the brake actuating cams 42d, 42f and 42j are forced down against the floor surface 9. This essentially normal force establishes an adhesive frictional force between the braked ball-bearing casters 1 and the floor surface 9.

Therein, the tangential components of the angular accelerations the rotary bases 37, 38 and 39 are momentarily unidirectional toward D1, acting beneath the brake actuating cams 42d, 42f and 42j counter to the adhesive frictional force between the braked ball-bearing casters 1 and the floor surface 9, and thus driving the wheelchair 30 in the D1 direction. The speed by which the vehicle advances can be switched by the inverter controlling the rotation of the drive motor 32 through an operation at the operation control panel 41.

Wherein the wheelchair 30 is to be driven in the D2 direction (toward the top of FIG. 3), the brake actuating cams 42a, 42g and 42k are lowered by operating the reciprocating shifters 43a, 43g and 43k through an operation at the operating control panel 41.

Wherein the wheelchair 30 is to be driven in the D3 direction (toward the right of FIG. 3), the brake actuating cams 42b, 42h and 42l are lowered through an operation at the operating control panel 41.

Wherein the wheelchair 30 is to be driven in the D4 direction (toward the bottom of FIG. 3), the brake actuating cams 42c, 42e and 42i are lowered through an operation at the operating control panel 41.

Accordingly, a wheelchair 30 embodied as in the foregoing changes running directions on the spot by shifting the brake actuating cams 42a to 42l up or down in response to an operation at the operation control panel 41.

The brake actuating cams 42a to 42l are of a certain length with respect to the rotational direction of the rotary bases 37, 38 and 39. Therefore, the braking means of the ball-bearing casters 1 are actuated for a predetermined interval. Consequently, since forces in directions non-collinear with the direction in which the vehicle 30 is to be steered due to the angular acceleration of the rotary bases 37, 38 and 39 also act under the brake actuating cams 42a to 42l against the floor surface face 9 via the ball-bearing casters 1, running stability is slightly compromised. However, the rotational direction of rotary base 37 is counter to that of rotary bases 38 and 39. Therefore, the non-collinear forces acting against the floor surface 9 through the ball-bearing casters 1 mounted on the rotary base 37 are to a certain extent counter-balanced by homologous non-collinear forces acting through the ball-bearing casters 1 on the rotary bases 38 and 39. Accordingly, practicable running stability is maintained.

Further, it is possible to make a turnabout easily within a limited space, since the orientation of the wheelchair 30 can be freely changed in a given place as follows. For example, when the wheelchair 30 oriented in the D1 direction of FIG. 3 is to be oriented in the D4 direction, the brake actuating cams 42e, 42f, 42k, and 42l are lowered. Thereupon, rotary base 38, to which the ball-bearing casters 1 beneath brake actuating cams 42e and 42f are fixed, moves in the D1 as well as the D4 directions with respect to the floor surface 9; and rotary base 39, to which the ball-bearing casters 1 beneath brake actuating cams 42k and 42l are fixed, moves in the D2 as well as the D3 directions with respect to the floor surface 9. Accordingly, the wheelchair 30 turns in the R1 rotational direction of FIG. 3.

In the same manner, the orientation of the wheelchair 30 can be changed in any direction wished.

The ball-bearing casters 1 are similar to ball transfer mechanisms described in a co-pending, commonly assigned application entitled "A BALL TRANSFER MECHANISM HAVING A BRAKING MECHANISM AND A VEHICLE EMPLOYING THE BALL TRANSFER MECHANISM" filed Dec. 5, 1997, to Akira INOUE, Serial Number (to be assigned) having a declaration executed on Dec. 2, 1997, claiming priority to Japanese applications JP 8-326979 filed Dec. 6, 1996 and JP 9-010544 filed Jan. 23, 1997. The application entitled "A BALL TRANSFER MECHANISM HAVING A BRAKING MECHANISM AND A VEHICLE EMPLOYING THE BALL TRANSFER MECHANISM" described above is hereby incorporated by reference in its entirety.

Various details of the present invention may be changed without departing from its spirit nor its scope. Furthermore, the foregoing description of the embodiments according to the present invention are provided for illustration only, and not for the purpose of limiting the invention as defined by the appended claims and their equivalents.

What is claimed is:

1. A floor-and-ground running vehicle, comprising:

a vehicle main body;

an axle drive source installed in said vehicle main body;

a plurality of at least three drive axles rotatably mounted into a bottom of said vehicle main body so as to extend floor-and-groundward, wherein said drive axles are drivable by said axle drive source;

a plurality of at least three rotary bases fixed to bottoms of said drive axles, wherein said rotary bases rotate with said drive axles; and at least one ball-bearing caster installed on each of said rotary bases and equipped with a braking means, wherein each of said ball-bearing casters is floor-and-ground ridable.

2. A vehicle as set forth in claim 1, wherein said ball-bearing casters are capable of planar relative movement with respect to the floor and ground, said ball-bearing casters comprising:

a ball-bearing caster main body;

a large ball for riding on the floor and ground, retained within said ball-bearing caster main body;

a plurality of small balls having smaller diameters than said large ball, wherein said small balls are ridable on an upper portion of said large ball roll following rolling motion of said large ball riding on the floor and ground, and said large ball is rotatable in retention within said ball-bearing caster main body; and a braking element disposed in an upper portion of said ball-bearing caster main body for checking rolling motion of said small balls.

3. A vehicle as set forth in claim 2, further comprising operational control means connected to said braking elements for selectively actuating said braking elements such that the vehicle is omnidirectionally steerable and such that its running direction is reversible.

4. A vehicle as set forth in claim 1, further comprising an axle drive train connected to said drive axles, wherein said drive train is configured to transmit driving power from said axle drive source to drive said drive axles such that at least two of said drive axles counter-rotate.

5. A vehicle as set forth in claim 4, wherein said ball-bearing casters are capable of planar relative movement with respect to the floor and ground, said ball-bearing casters comprising:

a ball-bearing caster main body;

a large ball for riding on the floor and ground, retained within said ball-bearing caster main body;

a plurality of small balls having smaller diameters than said large ball, wherein said small balls are ridable on an upper portion of said large ball roll following rolling motion of said large ball riding on the floor and ground, and said large ball is rotatable in retention within said ball-bearing caster main body; and a braking element disposed in an upper portion of said ball-bearing caster main body for checking rolling motion of said small balls.

6. A vehicle as set forth in claim 5, further comprising operational control means connected to said braking elements for selectively actuating said braking elements such that the vehicle is omnidirectionally steerable and such that its running direction is reversible.

7. A floor-and-ground running vehicle, comprising:

a vehicle main body;

an axle drive source installed in said vehicle main body;

at least one drive axle rotatably mounted into a bottom of said vehicle main body so as to extend floor-and-groundward, wherein said drive axle is drivable by said axle drive source;

at least one rotary base fixed to said drive axle bottomward, wherein said rotary base rotates with said drive axle; and at least three ball-bearing casters each equipped with a braking means and installed on said rotary base, wherein each of said ball-bearing casters is floor-and-ground ridable.

8. A vehicle as set forth in claim 7, wherein said ball-bearing casters are capable of planar relative movement with respect to the floor and ground, said ball-bearing casters comprising:

a ball-bearing caster main body;

a large ball for riding on the floor and ground, retained within said ball-bearing caster main body;

a plurality of small balls having smaller diameters than said large ball, wherein said small balls are ridable on an upper portion of said large ball roll following rolling motion of said large ball riding on the floor and ground, and said large ball is rotatable in retention within said ball-bearing caster main body; and a braking element disposed in an upper portion of said ball-bearing caster main body for checking rolling motion of said small balls.

9. A vehicle as set forth in claim 8, further comprising operational control means connected to said braking elements for selectively actuating said braking elements such that the vehicle is omnidirectionally steerable and such that its running direction is reversible.

10. A vehicle comprising:

at least three rotary bases supported on an underside of a main body of the vehicle;

a means for selectively synchronously rotating said rotary bases;

each of said rotary bases having at least one ball bearing caster fixed to a radially outward portion thereof, each of said ball bearing casters having a corresponding braking element configured for braking engagement with small to balls of said ball bearing caster;

a plurality of brake actuating cams, each being disposed in said main body proximate a radially outward position of a corresponding one of said rotary bases for selective engagement with a corresponding one of said braking elements for restricting rotation of said ball bearing caster.

* * * * *